United States Patent [19]

Gendron

[11] 4,364,365
[45] Dec. 21, 1982

[54] FUEL VAPORIZER FOR INTERNAL COMBUSTION ENGINE

[76] Inventor: Réjean Gendron, 169 chemin Baie Carriere, Val d'Or, Abitibi, Canada, J9P 4M5

[21] Appl. No.: 155,360

[22] Filed: Jun. 2, 1980

[51] Int. Cl.³ ............................................. F02M 31/02
[52] U.S. Cl. ....................................... 123/557; 165/52
[58] Field of Search ...................... 123/557, 1 A, 25 P, 123/25 J; 165/51, 52, 156

[56] References Cited

U.S. PATENT DOCUMENTS

| | | | |
|---|---|---|---|
| 1,168,136 | 1/1916 | White | 165/52 |
| 1,398,370 | 11/1921 | Eustis | 123/557 |
| 2,201,965 | 5/1940 | Cook | 123/557 |
| 3,447,514 | 6/1969 | Trafford | 123/25 B |
| 3,780,714 | 12/1973 | Dillow | 165/51 |
| 4,037,568 | 7/1977 | Schreiber | 123/25 J |
| 4,085,340 | 4/1978 | Furr et al. | 165/52 |
| 4,218,999 | 8/1980 | Shearer | 165/51 |

FOREIGN PATENT DOCUMENTS

| | | |
|---|---|---|
| 87481 | of 0000 | Canada . |
| 158872 | 11/1914 | Canada . |
| 168918 | 4/1916 | Canada . |
| 363931 | 2/1937 | Canada . |
| 364673 | 3/1937 | Canada . |

*Primary Examiner*—Charles J. Myhre
*Assistant Examiner*—E. Rollins Cross

[57] ABSTRACT

The fuel vaporizer of the present invention is provided for the purpose of improving the efficiency and decreasing the pollution of internal combustion engines, more particularly those used in automobiles and employing gasoline as a fuel. The fuel vaporizer includes a housing forming three separate chambers. A coiled tube extends within the central chamber and its inlet end portion extends through the first chamber and is connected to the outlet of the gasoline pump. The outlet of the coil communicates with the third chamber, which in turn is connected by a tubing to the carburator of the engine. The central chamber is connected in series with the engine cooling circuit by means of two end tubes extending through the first and last chamber, respectively, and opening within said central chamber. Air is bled from the air intake of the carburator; is passed through the first chamber; and is circulated back to the intake manifold downstream of the carburator. The first and last chambers are filled with granular material and the two end tubes are provided with heat-exchanger plates. The bled air is heated in the first chamber. The gasoline is progressively heated and vaporized to a dry vapor while flowing through the coil and through the heated granulated material in the last chamber before it is fed to the carburator.

10 Claims, 5 Drawing Figures

FUEL VAPORIZER FOR INTERNAL COMBUSTION ENGINE

The present invention relates to a fuel vaporizer for internal combustion engines.

BACKGROUND OF THE INVENTION

Various attempts have been made to pre-heat the gasoline in an internal combustion engine prior to feeding the same to the carburator, in order to improve mixture of the gasoline with the air and prevent the introduction of droplets of gasoline within the engine, which results in poor combustion and high pollution.

In known gasoline pre-heaters, there is often production of vapor locks because of localized overheating of the gasoline in the fuel line. This blocks the free flow of gasoline to the carburetor, with consequent stoppage of the engine. To avoid vapor lock, the gasoline is not heated as high as it should be, with the result that gasoline droplets still find their way into the intake manifold. In some other known gasoline pre-heating systems, the amount of pre-heated gasoline held in the system is quite large, and this is a cause of possible explosion.

OBJECT OF THE INVENTION

It is the object of the present invention to provide a gasoline pre-heating system for internal combustion engines, which obviates the above-noted disadvantages and which is characterized by the fact that the gasoline, or other liquid fuel, is boiled and vaporized into a gas before it is fed to the engine carburetor.

Still another object of the invention is to provide a gasoline vaporizer system in which there is efficient exchange between the fuel and the heating medium, and in which a minimum amount of fuel is heated and vaporized before its admission to the carburetor, whereby the device is safe in its use.

Another object of the present invention is to provide means for injecting hot air directly into the intake manifold along with the engine fumes in order to furnish combustion air for these fumes, while not cooling the fuel and air mixture supplied to the engine.

Another object of the present invention is to provide a system of the character described, which can be installed in association with existing carburetors without modifying the latter, except requiring adjustment of the carburetor needle valves to obtain a leaner mixture.

SUMMARY OF THE INVENTION

The fuel vaporizer device of the invention comprises first and second separate chambers, means for circulating fuel through the first chamber and for delivering it to the second chamber, means for progressively heating the fuel in the two chamber and thus vaporize the fuel, so that the fuel in the second chamber will be a vapor state. Granular material filling the second chamber is heated and is in intimate heat-exchange relation with the fuel to thereby complete conversion of the fuel to the gas state. The gaseous fuel is delivered from the second chamber to the carburetor. There are means for bleeding a portion of the air entering the carburetor air intake and for delivering it to the intake manifold of the engine downstream from the carburetor. This bled air is preferably heated in a third chamber of the device.

DETAILED DESCRIPTION OF THE PREFERRED EMBODIMENT

Figure 1:
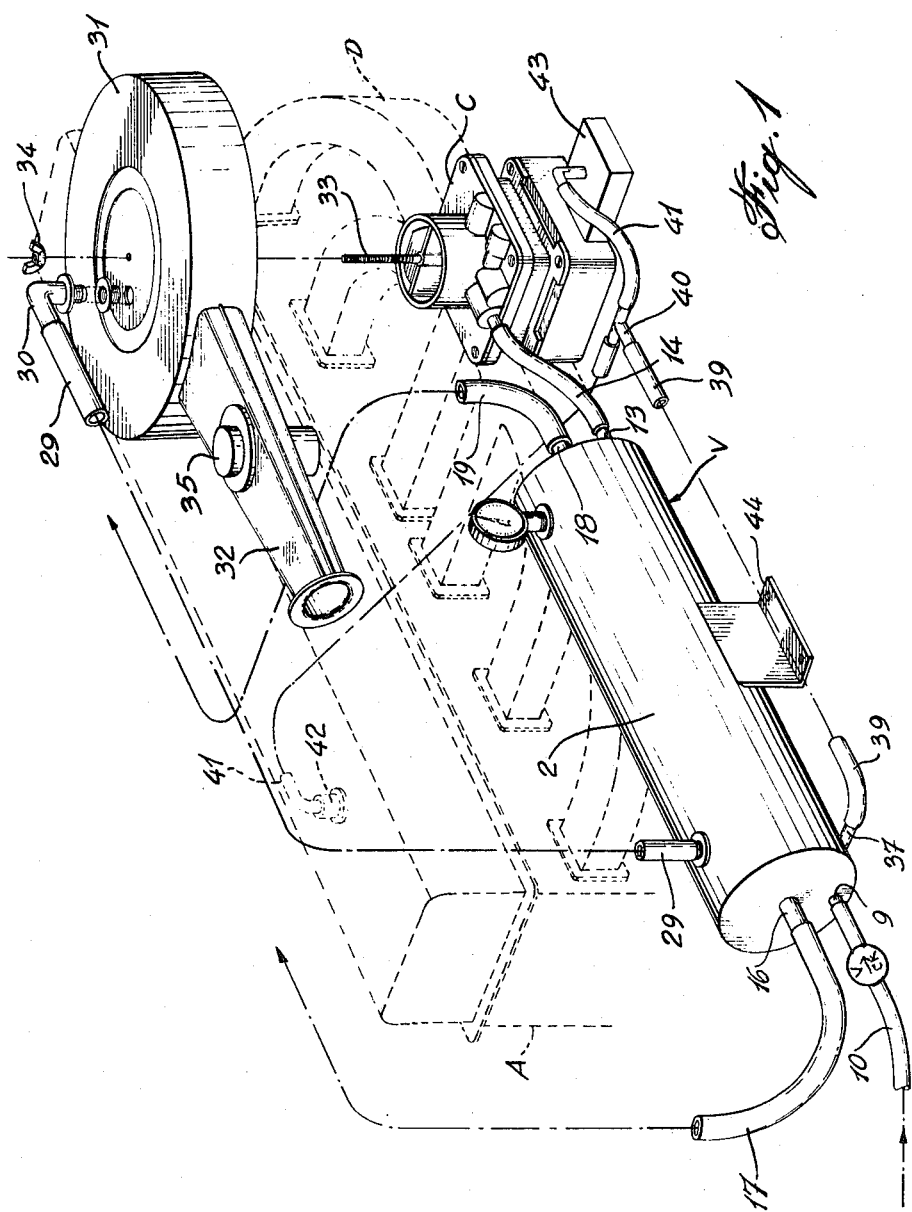
FIG. 1 is a perspective view of the fuel pre-heater device together with a conventional carburetor and air intake and showing the connections of the vaporizer device with the carburetor, the air intake and the liquid cooling system of the engine, the latter shown in dotted line.

The vaporizing device V comprises a cylindrical housing 1 completely jacketed by an external heat-insulating layer 2 and forming three separate chambers disposed in end-to-end relationship, namely: a first chamber 3, a central main chamber 4 and a third chamber 5, chambers 3 and 4 being at the inlet and outlet end, respectively, of the housing.

Figure 2:
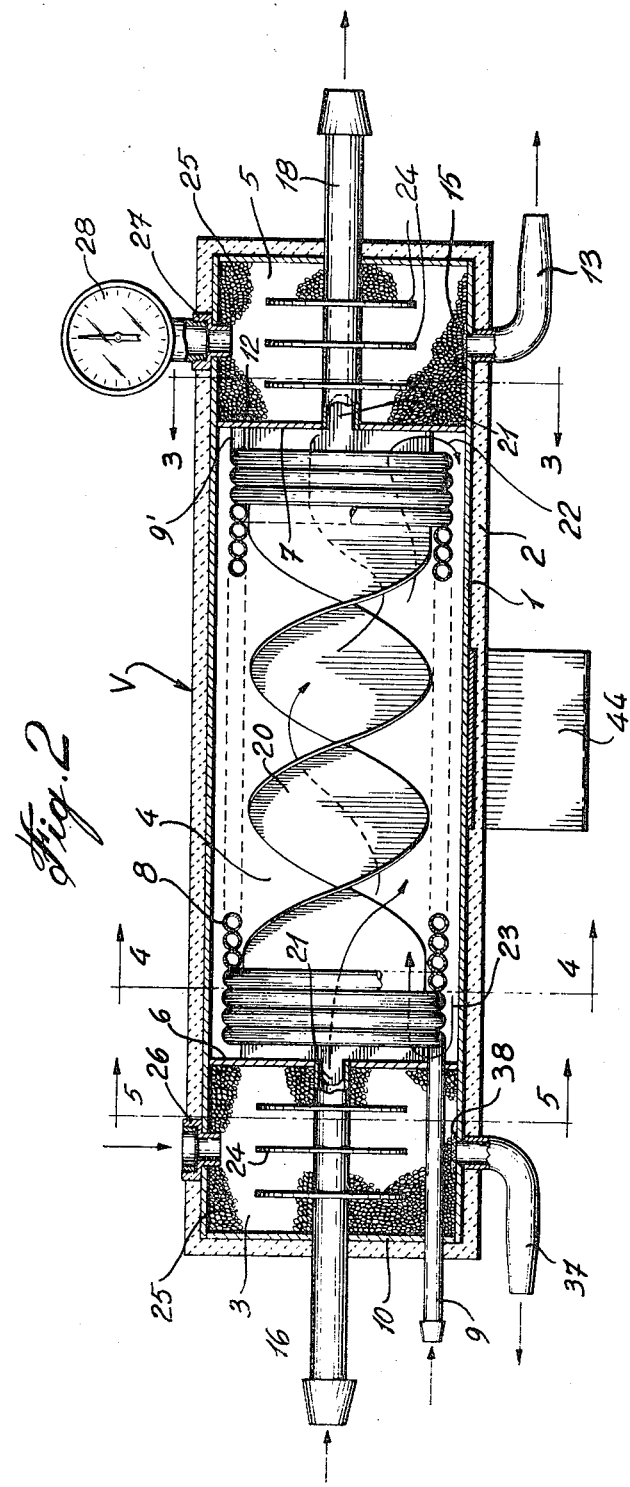
FIG. 2 is a longitudinal section of the fuel vaporizer device.
Figure 3:
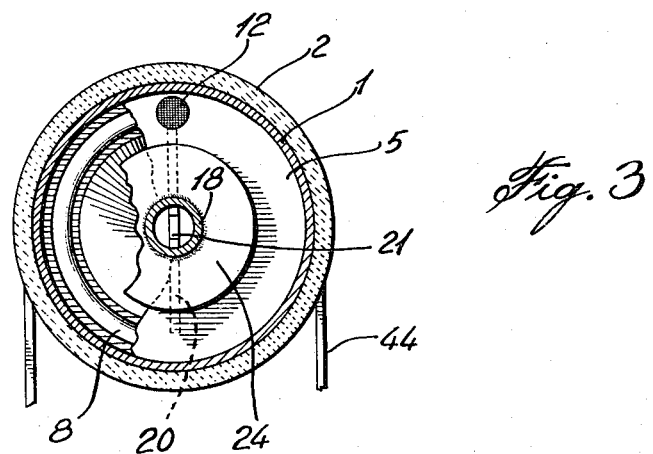
FIGS. 3, 4, and 5 are cross-sections taken along lines 3—3, 4—4, and 5—5, respectively, of FIG. 2.
Figure 4:
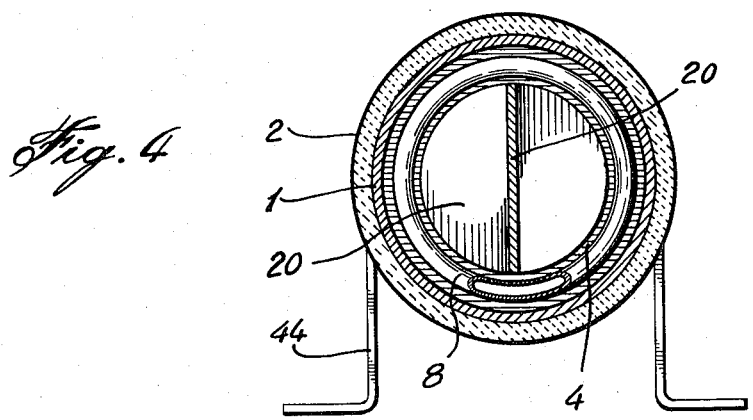
Figure 5:
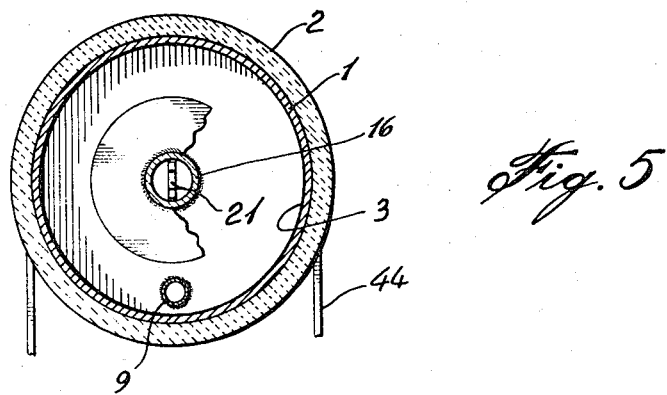

The three chambers are separated from one another by fixed partitions 6 and 7. A coil 8 is located within the central chamber 4, has a cylindrical shape and is spaced inwardly from the housing 1 and from partitions 6, 7. The tube spirals of coil 8 are contiguous. The coil 8 has a straight inlet portion 9, which extends through partition 6, through the first chamber 3 and through the end wall 10 of the housing and is adapted for connection with a flexible tubing 11, fitted with the conventional check valve, as shown, and connected to the outlet of the fuel pump (not shown) of the internal combustion engine A. The outlet end portion 9' of the coil 8 is welded, or otherwise secured, in a liquid-proof manner around a hole in the partition 7, so that the outlet of the coil is in direct communication with the third chamber 5. This outlet is covered by a filter screen 12, as clearly shown in FIG. 3. The bottom of the third chamber 5 is in communication with a gasoline outlet nipple 13, which is adapted to be connected with the conventional fuel inlet of the conventional carburetor C of the engine by means of a flexible tubing 14, which is preferably heat-insulated. The inlet of nipple 13 is also provided with a screen filter 15. The gasoline, or other type of fuel in coil 8, is heated by a liquid filling the main central chamber 4, said liquid being derived from the cooling liquid circuit of the engine A. More particularly, the hot liquid, which is normally water preferably added with an anti-freeze, is fed into the main chamber 4 by means of an inlet nipple 16, which is fixed to the partition 6 and communicates with the chamber 4 at one end, while the other end of the inlet nipple 16 extends outwardly of the housing 1 and is adapted to be connected to a flexible tubing 17 (see FIG. 1) adapted to be connected to the cooling liquid circuit of the engine 8. The liquid in chamber 4 leaves this chamber through an outlet nipple 18 extending centrally through the third chamber 5, outwardly of the housing and adapted to be connected by a flexible tubing 19, again adapted to be connected to the cooling liquid circuit of the engine. Preferably, the tubings 17 and 19 are series-connected in the hot liquid line going to the conventional passenger cabin heater of the automobile, so as to obtain liquid circulation through the vaporizer unit of the invention. As shown in FIG. 2, in order to obtain better heat-exchange relationship between the hot liquid in chamber 4 and the gasoline in the coiled tube 8, there is provided a spirallyshaped strip 20 located within the coil 8 and having flat narrow tabs 21 entering the inlet and outlet nipples 16 and 18, respectively, so as to hold the strip 20 in correct position. The liquid issuing from nipple 16 within the main chamber 4 flows on each side of the end tab 21 and then is caused by strip 20 to move in a spiral within the chamber 4 so as to extend the time the liquid is in contact with coil 8. At least part of the heating liquid tends to flow back along the outside of the coil 8 by passing in the space between the endmost spiral of coil 8 and the partition 7, as shown by arrow 22 in FIG. 2. Thus, the liquid recirculates all along the outside of the coil 8 and returns inside the coil at the inlet end of chamber 4, as shown by arrow 23. The heating liquid finally exits on each side of the end tab 21 of the strip 20 through the outlet nipple 18.

The inlet nipple 16 extends centrally of the first chamber 3 and is fitted with surrounding metal discs 24. Similarly, the outlet nipple 18 extends centrally through the third chamber 5 and is also fitted with circular discs 24. Both chambers 3 and 5 are filled with a granular material 25, such as charcoal, and preferably activated charcoal. The granular material 25 is in physical contact with the discs 24 and with the nipples 16 and 18, respectively, so that the granular material will be heated by the heating liquid going through the nipples 16 and 18. The chambers 3 and 5 are filled with the granular material 25 through couplings 26 and 27. Once the chambers are full, coupling 27 for the third chamber 5 is either plugged completely or provided with a manometer 28 to indicate the fuel pressure within the chamber 5. Normally, this manometer is not used and the coupling 27 is simply plugged. Coupling 26 is connected by a flexible tubing 29 (see FIG. 1), to an elbow 30 secured to, and in communication with, the interior of the central part of the conventional air filter casing 31 for the carburator C of the engine A, said casing 31 normally holding an annular air filter disposed in the radially outward portion of said casing. This casing is fitted with the normal air intake conduit 32 for admitting air on the outside of the air filter within the casing 31. Therefore, elbow 30 is in communication with the portion of the casing on the downstream side of the air filter close to the normal bolt 33 fixed to the carburator air inlet and serving to fix the air filter casing 31 positioned on top of the carburator by means of the usual nut 34. The air intake conduit 32 is also normally fitted with a conventional thermostatically-operated damper assembly 35 which, depending on outside weather, either admits air from the inlet at the outer end of conduit 32, or air through a side air intake 36, which is closer to the top of the engine and, therefore, admits warmer air. Thus, the temperature of the air entering the carburator can normally be controlled within a certain range.

The first chamber 3 is provided at its bottom with an air outlet elbow 37 having a filter screen 38 at its inlet end. This elbow 37 is connected by flexible tubing 39 (see FIG. 1) to a T connection 40, which is in turn series-connected in the conventional line 41 which connects the usual PCV valve 42 on top of the engine A with the downstream end of the carburator, that is for direct connection into the intake manifold D of the engine, as shown at 43. Therefore, the oil fumes originating in the engine are mixed with hot air and then fed directly into the intake manifold. Vaporizer device V has a bracket 44 for fixing device V in a suitable position close to engine A.

When the engine is running, there is a greater vacuum at the downstream end of the carburator C at the level of the intake manifold D, than in the air intake for the carburator, that is at the central part of casing 31. Therefore, filtered air will be bled from the air intake of the carburator through tubing 29, first chamber 3 and tubing 39 directly into the intake manifold downstream of the carburator. This bled air is heated when passing through first chamber 3, because it is in intimate heat-exchange relationship with the granular material filling this chamber and in turn heated by the inlet nipple 16 and the discs 24. The granular material 25 in the first chamber 3 also heats up the fuel, or gasoline, circulating through inlet section 9. Thus, the fuel is progressively heated in the first chamber without direct contact with the heating liquid in main chamber 4. When the liquid flows through the coil 8, it is then further progressively heated first to a boiling temperature and then vaporized, so that fuel in vapor phase enters the third chamber 5. In this third chamber, there might still be droplets of liquid fuel admixed with the gaseous fuel. Both come in intimate contact with the granular material 25 filling this chamber. This granular material is heated by heat-exchange relationship with the discs 24 and the outlet nipple 18, and any remaining fuel droplets are completely vaporized, whereby completely gaseous fuel issues from the third chamber to be admitted to the carburator.

This carburator is conventional and it has been found that it need not be modified and the gaseous vapor would then enter directly into the bowl provided with the usual float valve. However, the needle valves controlling fuel admission into the venturi of the carburator have to be regulated by means of the usual adjusting screws, not shown, so as to form a leaner mixture than otherwise necessary when using cold liquid fuel. The pressure existing within the third chamber would normally be approximately the pressure delivered by the fuel pump.

Because fuel is mixed with the air in the carburator while in completely gaseous state, it will be appreciated that no liquid droplets are present which would cause poor combustion. Much greater fuel efficiency is obtained and, consequently also, less pollution.

The pre-heated air circuit described, including the first chamber 3, forms a safety system because any sudden back flow of vaporized fuel through the air intake of the carburator will be immediately sucked by the air-bleeding path back into the intake manifold of the engine. Also, because the bled air is injected along with the engine oil fumes and in hot condition, it will provide for better combustion of these fumes.

As granulated material filling the two end chambers, it is preferred to use activated charcoal, since the latter has good filtering action for both the air and the gaseous fuel, and since it has an absorbent capacity to absorb moisture in the air circulating through the first chamber and in the gaseous fuel in the third chamber. But the main purpose of the granular material is to act as good heat-exchanging surfaces with the air and fuel, respectively, and to effectively decrease to a minimum the volume of gaseous in chamber 5.

The spirally-wound strip 20 located within the main chamber 4, is preferably coated with a heat-reflecting surface, such as chromium, which has been found to reflect the heat within heating liquid directly onto the coil 8, thereby resulting in a still better heat-exchange relationship with the gasoline flowing through the coil 8.

With all these arrangements, it is therefore possible to make the vaporizer device in a relatively small size for ease of installation of the device within the engine compartment. Yet the unit effectively completely vaporizes the fuel circulating therethrough and eliminates any remaining liquid droplets in the fuel.

The above-described vaporizer unit has been tested by having been installed on a passenger car, namely: a Pacer model manufactured by American Motors Corporation. Tests have been carried out for 10,000 miles, both in city and countryside driving and has averaged 45 miles per Imperial gallon, the car being rated to normally give a mileage of 17 to 19 miles per Imperial gallon.

The vaporizer device of the present invention is designed to heat the gasoline up to a temperature of about 250° F. The heated gasoline is maintained at a pressure above normal atmospheric pressure as produced by the gasoline pump of the engine. This temperature of 250° F. is much above the normal boiling temperature of about 100° F. at normal atmospheric pressure for gasoline and, therefore, all of the gasoline is fed in gaseous state to the carburetor.

I claim:

1. In combination, a fluid vaporizer device and an internal combustion engine having an engine coolant circuit, a fuel pump, a carburetor, an air intake for said carburetor located upstream of the latter, and an intake manifold located downstream from said carburetor, said device comprising first, second and third separate chambers, means for circulating heated engine coolant through said three chambers, means for bleeding a portion of the air from said air intake, for circulating said air portion through said first chamber while in heat-exchange relationship with the heated engine coolant circulating through said first chamber and for delivering the heated air to said intake manifold, means for circulating fuel through said second chamber and subsequently delivering said fuel into said third chamber while in heat-exchange relationship with the heated engine coolant circulating through said second and third chambers, granular material filling said second and third chambers, the fuel circulating through said second and third chambers being progressively heated and vaporized so that the fuel attains a gaseous state while in said third chamber, the heated granular material in said third chamber completing conversion of said fuel from liquid to gaseous state, and means for delivering said gaseous fuel from said third chamber to said carburetor.

2. The combination as defined in claim 1, wherein said granular material is charcoal.

3. The combination as defined in claim 1, wherein said granular material is activated charcoal.

4. A combination as defined in claim 1, 2 or 3, wherein said means for circulating fuel through said second chamber, and subsequently delivering said fuel to said third chamber, includes a coil of spirally-wound tubing extending within said second chamber having an inlet connected to said fuel pump and having an outlet in direct communication with said third chamber, a helical strip extending within said coil, and wherein said means for circulating heated engine coolant through said three chambers include an inlet nipple extending through said first chamber and communicating with one end of said second chamber and an outlet nipple communicating with the opposite end of said second chamber and extending through said third chamber and further including heat-conductive plates fixed to said inlet and outlet nipples and in contact with the granular material in said first and third chambers, said inlet and outlet nipples series connected in said liquid coolant circuit.

5. In combination, a fuel vaporizer device and an internal combustion engine having a liquid coolant circuit, a fuel pump, a carburetor, an air intake for said carburetor located upstream of the same, and an intake manifold downstream from said carburetor, said device comprising a housing defining a first, second and third separate chambers in end-to-end relationship, a fuel circulating tube forming a straight fuel inlet section extending completely through said first chamber, and forming a coil located within said second chamber, the outlet end of said coil being in direct communication with said third chamber, a fuel outlet nipple communicating with one side of said third chamber, said fuel inlet section connected to the outlet of said fuel pump and said fuel outlet nipple connected to the fuel inlet of said carburetor, a heating liquid inlet pipe extending centrally through said first chamber and communicating with one end of said second chamber, and a heating liquid outlet pipe communicating with the opposite end of said second chamber and extending through said third chamber, heat-conducting strips secured to and surrounding said inlet and outlet pipes, and respectively extending within said first and third chambers, granular material filling said first and third chambers, said inlet and outlet pipes series connected in the liquid coolant circuit of said engine, and an air line series connecting said first chamber with the air intake of said carburetor and with the intake manifold of said engine for bleeding part of the air entering the carburetor, heating it when flowing through said first chamber and delivering it directly into said intake manifold downstream from said carburetor, the fuel circulating through said coil being progressively heated and attaining a completely-gaseous state while in said third chamber.

6. The combination as defined in claim 5, further including a helical strip extending inside said coil within said second chamber.

7. A combination as defined in claim 6, wherein said helical strip is provided with narrow end tabs removably fitted within said inlet and outlet pipes, respectively, for holding said helical strip in position within said coil.

8. The combination as defined in claim 6 or 7, wherein said helical strip has a heat-reflecting surface.

9. The combination as defined in claim 5, wherein said second chamber has a cylindrical shape, said coil also defines a cylindrical shape and is spaced inwardly from the cylindrical wall and from the end walls of said second chamber.

10. The combination as defined in claim 5, 6 or 9, wherein said granular material is activated charcoal.

* * * * *